(12) United States Patent
Singh et al.

(10) Patent No.: US 8,399,577 B2
(45) Date of Patent: Mar. 19, 2013

(54) CURABLE EPOXY RESIN COMPOSITION

(75) Inventors: Bandeep Singh, Wytheville, VA (US); Stéphane Schaal, Sierentz (FR); Xavier Kornmann, Lauchringen (DE); Prateek Puri, Dwarka (IN)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/404,894

(22) Filed: Feb. 24, 2012

(65) Prior Publication Data

US 2012/0202918 A1    Aug. 9, 2012

Related U.S. Application Data

(63) Continuation of application No. PCT/EP2009/061038, filed on Aug. 27, 2009.

(51) Int. Cl.
  *C08K 3/36* (2006.01)
  *C08L 63/02* (2006.01)
  *H01B 3/40* (2006.01)
  *H01F 27/32* (2006.01)
  *H01L 23/29* (2006.01)

(52) U.S. Cl. ......... 525/524; 174/138 C; 257/793; 336/221; 523/457; 523/458; 523/466; 525/423; 525/476; 525/533

(58) Field of Classification Search ............ None
See application file for complete search history.

(56) References Cited

U.S. PATENT DOCUMENTS

| | | | |
|---|---|---|---|
| 3,878,146 A | 4/1975 | Charlton | |
| 3,926,904 A | 12/1975 | Scola | |
| 4,219,638 A | 8/1980 | Schulze et al. | |
| 4,285,853 A | 8/1981 | Schreiber | |
| 5,171,769 A * | 12/1992 | Bull et al. | 523/447 |
| 5,939,472 A | 8/1999 | Ito et al. | |
| 5,985,956 A | 11/1999 | Barsotti et al. | |
| 6,090,870 A * | 7/2000 | Chang et al. | 523/443 |
| 6,322,848 B1 | 11/2001 | Phenis et al. | |
| 2009/0286930 A1* | 11/2009 | Takahashi et al. | 524/612 |
| 2011/0291260 A1* | 12/2011 | Honda et al. | 257/737 |
| 2012/0022185 A1* | 1/2012 | Elgimiabi | 523/451 |

FOREIGN PATENT DOCUMENTS

| | | |
|---|---|---|
| JP | 7-238145 A | 9/1995 |
| JP | 2003 059 513 A | 7/2003 |
| KR | 2003 059 513 A | 7/2003 |

OTHER PUBLICATIONS

International Search Report (PCT/ISA/210) issued on Mar. 19, 2010, by European Patent Office as the International Searching Authority for International Application No. PCT/EP2009/061038.
Written Opinion (PCT/ISA/237) issued on Mar. 19, 2010, by European Patent Office as the International Searching Authority for International Application No. PCT/EP2009/061038.

* cited by examiner

*Primary Examiner* — Robert Sellers
(74) *Attorney, Agent, or Firm* — Buchanan Ingersoll & Rooney P.C.

(57) ABSTRACT

A curable epoxy resin composition including at least an epoxy resin component and a hardener component, and optionally further additives, wherein: (a) the epoxy resin component is an epoxy resin compound or a mixture of such compounds; (b) the hardener component includes (b1) an aliphatic and cycloaliphatic or aromatic polycarbonic acid anhydride; and (b2) a polyether-amine of the general formula (I), $H_2N-(C_nH_{2n}-O)_m-C_nH_{2n}-NH_2$, wherein n is an integer from 2 to 8; and m is from about 3 to about 100; (c) the polycarbonic acid anhydride [component (b1)] is present in the curable epoxy resin composition in a concentration of 0.60 Mol to 0.93 Mol; and (d) the polyether-amine of the general formula (I) [component (b2)] is present in the curable epoxy resin composition in a concentration of about 0.02 Mol to about 0.1 Mol.

50 Claims, No Drawings

US 8,399,577 B2

CURABLE EPOXY RESIN COMPOSITION

RELATED APPLICATION(S)

This application claims priority as a continuation application under 35 U.S.C. §120 to PCT/EP2009/061038 filed as an International Application on Aug. 27, 2009 designating the U.S., the entire content of which is hereby incorporated by reference in its entirety.

FIELD

The present disclosure relates to a curable epoxy resin composition comprising at least an epoxy resin component and at least a hardener component, said hardener component being a combination of a phthalic acid anhydride and a defined polyether-amine and wherein the phthalic acid anhydride and the polyether-amine are present in defined ratios. The resulting cured epoxy resin composition has a cracking resistance at temperatures as low as about minus 70° C. (−70° C.) combined with an excellent accuracy class performance and can be used as an encapsulating material for medium to high voltage electrical equipment, for example, for applications where the material is subjected to thermal shocks such as metal core-coil inserts of instrument or distribution transformers.

BACKGROUND INFORMATION

Cracking resistance of electrical encapsulating materials based on cured epoxy compositions, for example, at low temperatures, is an important technical characteristic. Encapsulating insulation materials in electrical applications, such as epoxy insulations, surrounding metal coils in electrical instrument transformers are prone to cracking at low temperatures, for example, below 0° C. This is mainly due to the difference in the Coefficient of Thermal Expansion (CTE) of the epoxy insulation system which generally is comparatively high and the Coefficient of Thermal Expansion (CTE) of the metal coil which is comparatively low. Epoxy resins being used as encapsulant for electrical equipment do not fulfill the low temperature cracking requirements.

In addition, encapsulating materials can exhibit an accuracy class standard of sufficient flexibility in order to prevent the metal insert from bending. Accuracy class is a standard used in the case of electrical appliances such as instrument transformers, the current error of which should remain within specified limits. Accuracy class is a function of the curing shrinkage that occurs in a curing epoxy resin composition upon cooling, whereby said shrinkage occurs when the glass transition temperature (Tg) of the epoxy resin composition is above room temperature (RT). A high glass transition temperature (Tg) of the epoxy resin composition that on curing is much higher than room temperature (RT<Tg), generally causes a high curing shrinkage of the epoxy resin composition in its glassy state, which subsequently causes internal stress of the cured composition. The internal stress then results in bending of the encapsulated metal insert, such as a magnetic core in an instrument transformer, and hence making the electrical commodity go out of accuracy class. The closer the glass transition temperature of the epoxy resin composition is to room temperature, the lower is the internal stress upon curing.

For improving the cracking resistance of the insulator, U.S. Pat. No. 3,926,904 and U.S. Pat. No. 5,939,472 discloses rubber inclusions into the epoxy composition. U.S. Pat. No. 4,285,853 and U.S. Pat. No. 5,985,956 disclose the use of nanoclay such as Montmorillonite and Wallastonite along with a silica filler in epoxy compositions. Nanoclays lower the overall Coefficient of Thermal Expansion (CTE) of the cured epoxy which improves their low temperature cracking resistance. However, the major shortcoming of this technique is the difficulty in exfoliating the nanoclay particles for obtaining a sufficiently increased surface area contact and maximum CTE reduction. Inclusion of such components into the epoxy resin composition is technically difficult, generally changes the physical properties of the epoxy resin composition and is cost and processing intensive.

For improving the accuracy class standard of sufficient flexibility and lowering the glass transition temperature (Tg) of an epoxy resin composition, U.S. Pat. No. 6,322,848 discloses the addition of aliphatic ether compounds containing terminal epoxy groups such as the glycidyl ether of polypropylene glycol or the glycidyl ether of 1,6 hexanediol as well as the addition of mono glycidyl ethers, such as a glycidyl ether of a $(C_{12}-C_{14})$-alcohol.

U.S. Pat. No. 3,878,146 suggests the addition of oxidized vegetable oils, such as oxidized linseed or soybean oil, to epoxy resin compositions in order to lower the glass transition point.

Many electrical types of equipment that require encapsulation, such as the metal coil of an instrument or distribution transformer, are manually and heavily padded with cotton tape before casting. The padding acts as cushioning and reduces the stress on the coil resulting from curing shrinkage of the cured epoxy resin composition upon cooling. However, such manual padding requiring additional production steps is time consuming, and considerably raises the production costs of the transformer.

Documents discussed above disclose additives either for improving the cracking resistance of electrical encapsulating materials made from cured epoxy compositions or for improving the accuracy class standard of sufficient flexibility of such epoxy resin compositions. These documents, however, do not disclose, for example, improving the cracking resistance and at the same time also the accuracy class standard of sufficient flexibility for electrical encapsulating materials based on cured epoxy resin compositions as may be desirable or required when these compositions are used as an encapsulant for encapsulating insulation materials in electrical applications surrounding magnetic cores such as in medium to high voltage electrical equipment, for example in electrical instrument or distribution transformers.

SUMMARY

According to an exemplary aspect, a curable epoxy resin composition is disclosed, comprising: an epoxy resin component, a hardener component, and optionally at least one additive, wherein: (a) said epoxy resin component is an epoxy resin compound or a mixture of epoxy resin compounds; (b) said hardener component comprises (b1) an aliphatic and cycloaliphatic or aromatic polycarbonic acid anhydride; and (b2) a polyether-amine of the general formula (I): $H_2N-(C_nH_{2n}-O)_m-C_nH_{2n}-NH_2$ (I) wherein n is an integer from 2 to 8; and m is from about 3 to about 100; (c) the polycarbonic acid anhydride is present in the curable epoxy resin composition in a concentration of 0.60 Mol to 0.93 Mol, calculated per one epoxy group weight equivalent present in the epoxy resin component of the composition; and (d) the polyether-amine of the general formula (I) is present in the curable epoxy resin composition in a concentration of about 0.02 Mol to about 0.1 Mol, calculated per one epoxy group weight equivalent present in the epoxy resin component of the composition.

According to another exemplary aspect, a method of producing a curable epoxy resin composition is provided, comprising mixing the components of the epoxy resin composition and all the further additives which optionally may be present in the epoxy resin composition, in any desired sequence, optionally under vacuum.

According to another exemplary aspect, a method of producing a curable epoxy resin composition is provided, comprising pre-reacting the components (b1) and (b2), or a part of the components (b1) and (b2), subsequently mixing the resulting material with the other components of the epoxy resin composition, wherein the mixing is conducted, optionally under vacuum, in any desired sequence.

According to another exemplary aspect, a method of producing an insulation system suitable for use in an electrical article is provided, the method comprising curing a curable epoxy resin composition.

According to another exemplary aspect, an electrical insulation system is provided, comprising a material formed from curing a curable epoxy resin composition, wherein the curable epoxy resin composition comprises: an epoxy resin component, a hardener component, and optionally at least one additive, wherein: (a) said epoxy resin component is an epoxy resin compound or a mixture of epoxy resin compounds; (b) said hardener component comprises (b1) an aliphatic and cycloaliphatic or aromatic polycarbonic acid anhydride; and (b2) a polyether-amine of the general formula (I): $H_2N-(C_nH_{2n}-O)_m-C_nH_{2n}-NH_2$ (I) wherein n is an integer from 2 to 8; and m is from about 3 to about 100; (c) the polycarbonic acid anhydride is present in the curable epoxy resin composition in a concentration of 0.60 Mol to 0.93 Mol, calculated per one epoxy group weight equivalent present in the epoxy resin component of the composition; and (d) the polyether-amine of the general formula (I) is present in the curable epoxy resin composition in a concentration of about 0.02 Mol to about 0.1 Mol, calculated per one epoxy group weight equivalent present in the epoxy resin component of the composition.

DETAILED DESCRIPTION

A curable epoxy resin composition can be obtained which upon curing yields a cured epoxy resin composition with a temperature cracking resistance down to temperatures of about minus 70° C. (−70° C.) and at the same time has an excellent accuracy class standard of sufficient flexibility when said curable epoxy resin composition comprises (a) at least an epoxy resin component such as a diglycidylether-bisphenol compound, e.g. diglycidylether-bisphenol A (DGEBA), (b) at least one hardener component comprising (b1) a polycarbonic acid anhydride, preferably a phthalic acid anhydride such as methyl-tetrahydrophthalic anhydride (MTHPA), and (b2) a selected polyether-amine, wherein (c) the polycarbonic acid anhydride and the polyether-amine are present in the curable epoxy resin composition in a defined ratio. Said curable epoxy resin composition may contain further known additives. The cured epoxy resin composition made therefrom having an excellent Accuracy Class Performance combined with excellent low temperature cracking resistance further satisfies the cost constraints and is suitable for the use as an encapsulating material for electrical applications, for example, for applications in medium to high voltage electrical equipment where the material is subjected to thermal shocks at low temperatures.

An exemplary composition can address a technical problem of producing a curable epoxy resin composition which upon curing yields a cured epoxy resin composition useful as an encapsulant in medium to high voltage electrical equipment that combines, at comparatively low cost, excellent accuracy class performance with a cracking resistance at temperatures as low as about minus 70° C. (−70° C.), and which can be used as an encapsulant without any padding. In addition, these properties are obtained with no loss to the Automated Pressure Gelation (APG) processability or to the vacuum casting process of the curable epoxy resin composition, whereby the cured epoxy resin composition substantially retains the mechanical, thermal ageing and dielectric properties as obtained in other epoxy resin compositions. By using an exemplary composition, the amount of processing equipment required is reduced. The direct addition of all the components translates into no change to the existing manufacturing setup. A reduction in the amount of catalyst further reduces the cost per epoxy casting.

Disclosed is a curable epoxy resin composition comprising at least an epoxy resin component and a hardener component, and optionally further additives, wherein:
(a) said epoxy resin component is an epoxy resin compound or a mixture of such compounds;
(b) said hardener component comprises
 (b1) an aliphatic and cycloaliphatic or aromatic polycarbonic acid anhydrides, for example, a phthalic acid anhydride; and
 (b2) a polyether-amine of the general formula (I):

$$H_2N-(C_nH_{2n}-O)_m-C_nH_{2n}-NH_2 \quad (I)$$

wherein n is an integer from 2 to 8; and m is from about 3 to about 100; wherein the polycarbonic acid anhydride, for example, the phthalic acid anhydride [component (b1)] is present in the curable epoxy resin composition in a concentration of 0.60 Mol to 0.93 Mol, calculated per one epoxy group weight equivalent present in the epoxy resin component of the composition; and
(d) the polyether-amine of the general formula (I) [component (b2)] is present in the curable epoxy resin composition in a concentration of about 0.02 Mol to about 0.1 Mol, calculated per one epoxy group weight equivalent present in the epoxy resin component of the composition.

Disclosed is a method of producing said curable epoxy resin composition. Also disclosed is the use of said curable epoxy resin composition for the production of insulation systems in electrical articles.

Disclosed is a curable epoxy resin composition comprising at least an epoxy resin component and a hardener component, and optionally further additives, as defined above, wherein all the components (b1) and (b2) or a part of the components (b1) and (b2) have separately been pre-reacted and subsequently been added to the curable epoxy resin composition.

Disclosed is a cured epoxy resin composition, which is present in the form of an electrical insulation system, for example, in the form of an electrical insulator. Also disclosed are electrical articles comprising an electrical insulation system made according to an exemplary aspect.

The epoxy resin component present in the curable epoxy resin composition contains at least two 1,2-epoxy groups per molecule. Cycloaliphatic and cycloaromatic epoxy resin compounds comprise unsubstituted glycidyl groups and/or glycidyl groups substituted with methyl groups. These glycidyl compounds have an epoxy value (equiv./kg), for example, of at least three, for example, at least four and, for example, at about five or higher, for example, about 5.0 to 6.1. Examples include optionally substituted epoxy resins of formula (II):

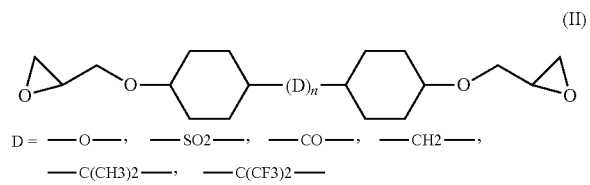

or optionally substituted epoxy resins of formula (III):

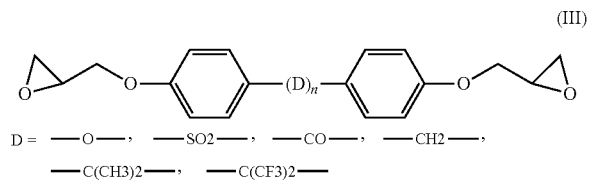

Compounds of formula (II) or formula (III) wherein D is [—(CH$_2$)—] or [—C(CH$_3$)$_2$—] are exemplary. Examples include compounds of formula (III) wherein D is [—(CH$_2$)—] or [—C(CH$_3$)$_2$—], and, for example, [—C(CH$_3$)$_2$—], i.e. diglycidylether of 2,2-bis-(4-hydroxyphenyl)-propane [diglycidylether of bisphenol A (DGEBA)]. DGEBA is commercially available as an epoxy resin component, e.g. as Epilox A19-00 (Leuna Harze GmbH.) or similar products. DGEBA, for example, has an epoxy value (equiv./kg) of at least three, for example, at least four and, for example, at about five or higher, for example, about 5.0 to 6.1.

Exemplary cycloaliphatic epoxy resin compounds are for example Araldite® CY 184 or CY 179 (Huntsman Advanced Materials Ltd.), a cycloaliphatic diglycidylester epoxy resin compound having an epoxy content of 5.80-6.10 (equiv/kg) or Araldite® CY 5622 (Huntsman Advanced Materials Ltd.), a modified diglycidylester epoxy resin compound having an epoxy content of 5.80-6.10 (equiv/kg). Araldite® CY 5622 is a hydrophobic cycloaliphatic epoxy formulation for hydrophobicity transfer and recovery in outdoor epoxy resin compositions. A hydrophobic cycloaliphatic epoxy formulation means that the filler material has been pre-treated with a silane or a silane additive has been added to the composition.

Further exemplary epoxy resins include, for example, hexahydro-o-phthalic acid-bis-glycidyl ester, hexahydro-m-phthalic acid-bis-glycidyl ester or hexahydro-p-phthalic acid-bis-glycidyl ester. Exemplary epoxy resin compounds are liquid at room temperature or when heated to a temperature of up to about 65° C.

An exemplary embodiment is that the epoxy resin composition as defined above further contains a defined amount of a diglycidyl polyether of formula (IV):

epoxy-CH$_2$—O—(C$_n$H$_{2n}$—O)$_m$—C$_n$H$_{2n}$—O—CH$_2$-epoxy (IV)

wherein [—(C$_n$H$_{2n}$—O)$_m$—] and n and m have the same meaning as given for the compounds of formula (I) above. Exemplary compounds of formula (IV) are for example long chain polypropylene glycol diglycidyl ether with an average molecular weight within the range of about 400 to about 10000 Dalton, for example, within the range of about 400 to about 5000 Dalton. Such compounds are available, for example, from the company Huntsman advanced materials, Lonza, Aditya Birla Epoxy BASF under various the trade names.

The compound of formula (IV) can be present in an amount within the range of 5 to 30 phr (parts per hundred parts) of the cycloaliphatic or aromatic epoxy resin component, for example, within the range of 5 to 15 phr, and, for example, within the range of 7 to 10 phr of the cycloaliphatic or aromatic epoxy resin component, which can be an epoxy resin component of formula (II) and/or formula (III).

A part of the hardener component [component (b1)] is an acid anhydride. Such anhydrides can be aliphatic and cycloaliphatic or aromatic polycarbonic acid anhydrides. Examples include phthalic anhydride, methylhydrophthalic anhydride, and methyltetrahydrophthalic anhydride (MTHPA). MTHPA is commercially available and exists in different forms, for example, as 4-methyl-1,2,3,6-tetrahydrophthalic anhydride or as 4-methyl-3,4,5,6-tetrahydrophthalic anhydride. 4-methyl-1,2,3,6-tetrahydrophthalic anhydride and 4-methyl-3,4,5,6-tetrahydrophthalic anhydride are compounds that can be used.

Methyltetrahydrophthalic anhydride (MTHPA) is often supplied commercially as a mixture containing MTHPA isomers as the main component, together with other anhydrides, such as tetrahydrophthalic anhydride (THPA), methylhexahydrophthalic anhydride (MHHPA) and/or phthalic anhydride (PA). Such mixtures may also be used. The content of MTHPA within such a mixture is, for example, at least 50% by weight, for example, at least 60% by weight, for example, at least 70% by weight, for example, at least 80% by weight, and for example, at least 90% by weight, calculated to the total weight of the mixture.

The acid anhydride hardener, for example, the phthalic acid anhydride [component (b1)], is, for example, present in the curable epoxy resin composition in a concentration of 0.65 Mol to 0.85 mol, for example, 0.68 mol to 0.75 mol and, for example, at about 0.70 mol, calculated per one epoxy group weight equivalent present in the epoxy resin component of the composition.

The curable epoxy resin composition according to the present disclosure further comprises the hardener component (b2) being a polyether-amine compound of the general formula (I). In this formula (I): n can be an integer from 2 to 5, for example, 2, 3, or 5, for example, 3 or 5; and m can be within the range of about 4 to about 70, for example, about 5 to about 40, for example, about 5 to about 30, for example, about 6 to about 20. Compounds of formula (I) generally have an average molecular weight and are mixtures of compounds with different values of m.

Therefore, a combination of two or more compounds of formula (I) with different molecular weights or a compound of formula (I) with an average molecular weight may be used. The optimized molecular weight also depends on the epoxy resin component used and can be optimized by the expert in the art.

The residue [—C$_n$H$_{2n}$—O—] of formula (I) can stand for ethylene-oxy[-CH$_2$—CH$_2$O—]; 1-methyl-ethylene-oxy[-CH$_2$—CH(CH$_3$)O—]; 2-methyl-ethylene-oxy[-CH(CH$_3$)—CH$_2$O—]; n-propylene-oxy[-CH$_2$—CH$_2$—CH$_2$O—]; and 2,2-dimethyl-propylene-oxy[-CH$_2$—C(CH$_3$)$_2$—CH$_2$O—].

The residue [—C$_n$H$_{2n}$—O—] can stand for ethylene-oxy or propylene-oxy.

The polyether-amine of the general formula (I) [component (b2)] is present in the curable epoxy resin composition, for example, in a concentration from about 0.04 mol to about 0.9 mol, for example, from about 0.06 mol to about 0.08 mol and, for example, about 0.07 mol to about 0.08 mol, calculated per one epoxy group weight equivalent present in the epoxy resin component of the composition.

The total amount of component (b1) and component (b2) within the epoxy resin composition can be used in concentrations within the range of 0.8 to 1.2 reactive group equivalents, contained in the total amount of component (b1) and component (b2), calculated per one epoxy equivalent present in the epoxy resin component; for example, one reactive group equivalent, contained in the total amount of component (b1) and component (b2), per one epoxy equivalent present in the epoxy resin component.

It is believed that the function of the components (b2) as used in combination with component (b1) lies in the flexibilisation of the cured epoxy resin composition providing the desired or required accuracy class performance. However, the present disclosure is not bound to this explanation.

The curable epoxy resin composition may comprise further a filler material, for example, a mineral filler, and a curing agent for enhancing the polymerization of the epoxy resin with the hardener. Further additives may be selected from processing aids, hydrophobic compounds including silicones, wetting/dispersing agents, plasticizers, antioxidants, light absorbers, pigments, flame retardants, fibers and other additives generally used in electrical applications.

Processing aids are for example BYK W9010 (a phosphate ester) from BYK Chemie or plasticizers like phthalate esters are added to improve the rheological properties of the liquid mix resin.

The mineral filler can be selected from filler materials as are generally used as fillers in electrical insulations. Said filler can be selected from the group of filler materials comprising inorganic oxides, inorganic hydroxides and inorganic oxyhydroxides, for example, silica, quartz, known silicates, aluminum oxide, aluminum trihydrate [ATH], titanium oxide or dolomite [$CaMg(CO_3)_2$], metal nitrides, such as silicon nitride, boron nitride and aluminum nitride or metal carbides, such as silicon carbide. Examples include silica and quartz, for example, silica flour, with a $SiO_2$-content of about 95-98% by weight.

The mineral filler has an average grain size suitable for the use in electrical insulation systems and is generally within the range of 10 micron up to 3 mm. In an exemplary embodiment, an average grain size (at least 50% of the grains) is within the range of about 1 μm to 300 μm, for example, from 5 μm to 100 μm, or a selected mixture of such average grain sizes. In an exemplary embodiment, a filler material with a high surface area can be used.

The inorganic filler is present in the epoxy resin composition, depending on the final application of the epoxy resin composition, for example, within the range of about 50% by weight to about 80% by weight, for example, within the range of about 60% by weight to about 75% by weight, for example, at about 65% by weight to about 70% by weight, for example, at about 68% by weight to about 70% by weight, calculated to the total weight of the epoxy resin composition.

The filler material may optionally be coated for example with a silane or a siloxane known for coating filler materials, for example, dimethylsiloxanes which may be cross linked, or other known coating materials.

The filler material optionally may be present in a porous form. As porous filler material, which optionally may be coated, is understood, that the density of said filler material is within the range of 60% to 80%, compared to the real density of the non-porous filler material. Such porous filler materials have a higher total surface than the non-porous material. Said surface can be higher than 20 $m^2/g$ (BET $m^2/g$) and, for example, higher than 30 $m^2/g$ (BET) and, for example, is within the range of 30 $m^2/g$ (BET) to 100 $m^2/g$ (BET), for example, within the range of 40 $m^2/g$ (BET) to 60 $m^2/g$ (BET).

Exemplary curing agents are for example tertiary amines, such as benzyldimethylamine or amine-complexes such as complexes of tertiary amines with boron trichloride or boron trifluoride; urea derivatives, such as N-4-chlorophenyl-N',N'-dimethylurea (Monuron); optionally substituted imidazoles such as imidazole or 2-phenyl-imidazole. Examples are tertiary amines, for example, 1-substituted imidazole and/or N,N-dimethylbenzylamine, such as 1-alkyl imidazoles which may or may not be substituted also in the 2-position, such as 1-methyl imidazole or 1-isopropyl-2-methyl imidazole. An example is 1-methyl imidazole. The amount of catalyst used is a concentration of about 0.05% to 0.2% by weight, for example, about 0.15% by weight, calculated to the weight of the epoxy resin component present in the composition.

The amount of catalyst used in a comparative filled epoxy resin composition is about 0.5% by weight calculated to the weight of the epoxy resin component. It is surprising that the amount of catalyst employed in an exemplary aspect can be reduced to a concentration of less than one third compared to a comparative composition. The addition of a catalyst can be optional as the curing speed of the exemplary composition is distinctly higher than the curing speed of a comparative epoxy resin composition not comprising a compound of formula (I).

Suitable hydrophobic compounds or mixtures of such compounds, for example, for improving the self-healing properties of the electrical insulator may be selected from the group comprising flowable fluorinated or chlorinated hydrocarbons which contain —$CH_2$-units, —CHF-units, —$CF_2$-units, —$CF_3$-units, —CHCl-units, —$C(Cl)_2$-units, —$C(Cl)_3$-units, or mixtures thereof; or a cyclic, linear or branched flowable organopolysiloxane. Such compounds, also in encapsulated form, can be employed.

The hydrophobic compound can have a viscosity in the range from 50 cSt to 10,000 cSt, for example, in the range from 100 cSt to 10,000 cSt, for example, in the range from 500 cSt to 3000 cSt, measured in accordance with DIN 53 019 at 20° C.

Suitable polysiloxanes can be linear, branched, cross-linked or cyclic. The polysiloxanes can be composed of —[Si(R)(R)O]-groups, wherein R independently of each other is an unsubstituted or substituted, for example, fluorinated, alkyl radical having from 1 to 4 carbon atoms, or phenyl, for example, methyl, and wherein said substituent R may carry reactive groups, such as hydroxyl or epoxy groups. Non-cyclic siloxane compounds, for example, on average have about from 20 to 5000, for example, 50-2000, —[Si(R)(R)O]-groups. Exemplary cyclic siloxane compounds are those comprising 4-12, and, for example, 4-8, —[Si(R)(R)O]-units.

The hydrophobic compound is added to the epoxy resin composition, for example, in an amount of from 0.1% to 10%, for example, in an amount of from 0.25% to 5% by weight, for example, in an amount of from 0.25% to 3% by weight, calculated to the weight of the epoxy resin component present.

Also disclosed is a method of producing the curable epoxy resin composition as described above, wherein the components of the epoxy resin composition, as defined above, and all the further additives which optionally may be present in the epoxy resin composition, are mixed in any desired sequence, optionally under vacuum.

Also disclosed is a method of producing the curable epoxy resin composition comprising at least an epoxy resin component and a hardener component and optionally further additives, as defined above, wherein the components (b1) and (b2), or a part of the components (b1) and (b2), are separately pre-reacted and are subsequently added to the other components of the curable epoxy resin composition and mixed with these components, optionally under vacuum, in any desired sequence.

The uncured epoxy resin composition is cured, for example, under application of vacuum, at a temperature, for example, within the range of 50° C. to 280° C., for example, within the range of 100° C. to 200° C., for example, within the range of 100° C. to 170° C., and, for example, at about 130° C. and during a curing time within the range of about 2 hours to about 10 hours. Curing generally is possible also at lower temperatures, whereby at lower temperatures complete curing may last up to several days depending on the catalyst present and its concentration.

Suitable processes for shaping the cured epoxy resin compositions of the disclosure are for example the APG (Automated Pressure Gelation) Process and the Vacuum Casting Process. Such processes typically include a curing step in the mold for a time sufficient to shape the epoxy resin composition into its final infusible three dimensional structures, typically up to ten hours, and a post-curing step of the demolded article at elevated temperature to develop the ultimate physical and mechanical properties of the cured epoxy resin composition. Such a post-curing step may take, depending on the shape and size of the article, up to thirty hours.

Exemplary uses of the insulation systems produced according to the present disclosure are dry-type transformers, for example, cast coils for dry type distribution transformers, for example, vacuum cast dry distribution transformers, which within the resin structure contain electrical conductors; medium and high-voltage insulations for indoor and outdoor use, like breakers or switchgear applications; medium and high voltage bushings; as long-rod, composite and cap-type insulators, and also for base insulators in the medium-voltage sector, in the production of insulators associated with outdoor power switches, measuring transducers, leadthroughs, and overvoltage protectors, in switchgear constructions, in power switches, and electrical machines, as coating materials for transistors and other semiconductor elements and/or to impregnate electrical components.

The following examples illustrate the disclosure without limiting the scope of the claimed disclosure.

Examples 1A to 1D

The epoxy resin, the hardener components, as well as the further additives as listed in Table 1 were intensively mixed in a vessel under application of vacuum as given for the Examples 1A, 1B, 1C and 1D. Analogously a comparative Example was prepared, named "Reference", being a comparative composition as given in Table 1.

TABLE 1

| Components | Reference | Example 1A | Example 1B | Example 1C | Example 1D |
|---|---|---|---|---|---|
| CY 228-1 (Resin) | 100 | 100 | 100 | 90 | 90 |
| DER 732P (Resin) | | | | 10 | 10 |
| HY 918 (Hardener) | 85 | 70 | 65 | 65 | 65 |

TABLE 1-continued

| Components | Reference | Example 1A | Example 1B | Example 1C | Example 1D |
|---|---|---|---|---|---|
| PEA D400 (Hardener) | | 15 | 10 | 10 | 10 |
| PEA D2000 (Hardener) | | | 12 | 12 | 12 |
| DY045 (Flexibilizer) | 20 | 20 | 20 | 20 | 20 |
| DY 062 (Catalyst) | 0.5 | 0.15 | 0.15 | 0.15 | 0.15 |
| TD 202 (Color) | 1.5 | 1.5 | 1.5 | 1.5 | 1.5 |
| W12 (Filler) | 385 | 384 | 391 | 391 | 448 |
| BYK W9010 (Processing aid) | | | 2 | 2 | 2 |

CY 228-1 (Resin): DGEBA with an epoxy equivalent of 5.1 Eq/kg
DER 732P (Resin): long chain polypropylene glycol diglycidyl ether, average molecular weight: 600
HY 918 (Hardener): MTHPA; molecular weight (mw): 166.
PEA D400 (Hardener): poly(ethyleneoxy)amine; mw: 400
PEA D2000 (Hardener): poly(ethyleneoxy)amine; mw: 2000
DY045 (Flexibilizer): polyethyleneoxide; mw: 400
DY 062 (Catalyst): benzyldimethylamine
W12 (Filler): silica, average particle size of about $10^{-2}$ mm.

Example 2

Analogous results are obtained when the epoxy resin CY 228-1 as used in the compositions of Table 1 is replaced by a resin of formula (III) wherein D=[—$CH_2$—].

Example 3

Analogous results are obtained when the epoxy resin CY 228-1 as used in the compositions of Table 1 is replaced by an aliphatic resin of formula (II) wherein D=[—$C(CH_3)$—] or D=[—$CH_2$—], such as Araldite® CY 184 (Huntsman Advanced Materials Ltd.), a cycloaliphatic diglycidylester epoxy resin compound having an epoxy content of 5.80-6.10 (equiv/kg) or Araldite® CY 5622 (Huntsman Advanced Materials Ltd.), a modified diglycidylester epoxy resin compound having an epoxy content of 5.80-6.10 (equiv/kg).

Example 4

Improved results are obtained when Examples 1A, 1B, 1C and 1D of Table 1 are repeated, with the difference that the hardener components are pre-reacted and subsequently added to the curable epoxy resin composition.

Discussion

The use of Polyetheramine D2000 results in an increase in the mix viscosity and its addition to the curable epoxy composition is complimented with a processing aid, a phosphate ester based filler dispersing agent, BYK W9010.

In the compositions 1A, 1B, 1C and 1D the polyetheramine may be varied, for example, from 10 to 15 phr of polyether-amine D400, for example of polyether-amine PEA D400 (from BASF).

The polyether-amine D2000 may be varied, for example, from 11 to 15 phr, for example of PEA D2000 (from BASF). The addition of a phosphate ester used as a filler dispersing agent and a processing aid may be varied, for example, from 0.5 to 2 phr, for example: Chemie BYK W9010 (from BYK Chemie).

Tested compositions 1A, 1B, 1C and 1D as given in Table 1 passed low temperature cracking tests and performed well at temperatures ranging from −10 to −70° C., unlike the Reference which repeatedly failed above −40° C. Moreover, the mechanical, thermal and electrical properties of the formulations 1A, 1B, 1C and 1D were comparable with the values obtained from the Reference. Measuring the accuracy class performance, Reference of Table 1 gave a current error of more than 10%. In comparison, the compositions 1A, 1B, 1C and 1D as given in Table 1 have a much improved accuracy class performance.

The compositions 1A and 1B showed an improved accuracy class performance with a current error in the Instrument Transformer of only 2%; the compositions 1C and 1D showed an improved accuracy class performance with a current error in the Instrument Transformer of equal to or less than 0.5%. This enables the manufacturing of padding-free electrical equipment requiring encapsulation and will lower the cost per unit of the electrical equipment drastically while retaining its mechanical, thermal and electrical properties.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A curable epoxy resin composition, comprising:
an epoxy resin component,
a hardener component, and
optionally at least one additive,
wherein:
(a) said epoxy resin component is an epoxy resin compound or a mixture of epoxy resin compounds;
(b) said hardener component comprises
(b1) an aliphatic and cycloaliphatic or aromatic polycarbonic acid anhydride; and
(b2) a polyether-amine of the general formula (I):

$$H_2N-(C_nH_{2n}-O)_m-C_nH_{2n}-NH_2 \quad (I)$$

wherein n is an integer from 2 to 8; and m is from about 3 to about 100;
(c) the polycarbonic acid anhydride is present in the curable epoxy resin composition in a concentration of 0.60 Mol to 0.93 Mol, calculated per one epoxy group weight equivalent present in the epoxy resin component of the composition; and
(d) the polyether-amine of the general formula (I) is present in the curable epoxy resin composition in a concentration of about 0.02 Mol to about 0.1 Mol, calculated per one epoxy group weight equivalent present in the epoxy resin component of the composition.

2. The composition according to claim 1, wherein the epoxy resin component comprises glycidyl compounds containing at least two 1,2-epoxy groups per molecule and having an epoxy value (equiv./kg) of at least three.

3. The composition according to claim 2, wherein the epoxy resin component is optionally substituted and is an epoxy resin of formula (II):

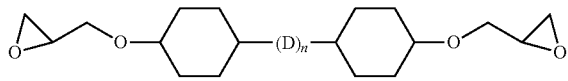

(II)

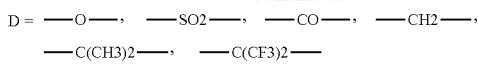

$n$ = zero or 1 or of formula (III):

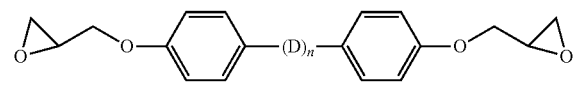

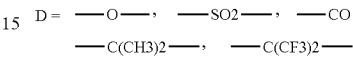

$n$ = zero or 1.

4. The composition according to claim 1, wherein the epoxy resin is selected from the group consisting of hexahydro-o-phthalic acid-bis-glycidyl ester, hexahydro-m-phthalic acid-bis-glycidyl ester and hexahydro-p-phthalic acid-bis-glycidyl ester.

5. The composition according to claim 1, wherein said composition further contains an amount of a diglycidyl polyether of formula (IV):

$$\text{epoxy-CH}_2-O-(C_nH_{2n}-O)_m-C_nH_{2n}-O-CH_2\text{-epoxy} \quad (IV)$$

wherein $[-(C_nH_{2n}-O)_m-]$ and n and m have the same meaning as given for the compounds of formula (I) of claim 1.

6. The composition according to claim 5, wherein the compound of formula (IV) is a long chain polypropylene glycol diglycidyl ether with an average molecular weight within the range of about 400 to about 10000 Dalton.

7. The composition according to claim 5, wherein the compound of formula (IV) is present in an amount within the range of 5 to 30 phr (parts per hundred parts) of the epoxy resin component.

8. The composition according to claim 1, wherein the hardener component (b1) is selected from the group consisting of phthalic anhydride, methylhexahydrophthalic anhydride and methyltetrahydrophthalic anhydride (MTHPA).

9. The composition according to claim 1, wherein the hardener component (b1) is present in the curable epoxy resin composition in a concentration of 0.65 mol to 0.85 mol, calculated per one epoxy group weight equivalent present in the epoxy resin component of the composition.

10. The composition according to claim 1, wherein in formula (I), n is an integer from 2 to 5; and m is within the range of about 4 to about 70.

11. The composition according to claim 1, wherein the residue $[-C_nH_{2n}-O-]$ of formula (I) stands for ethylene-oxy; 1-methyl-ethylene-oxy; 2-methyl-ethylene-oxy; n-propylene-oxy; or 2,2-dimethyl-propylene-oxy.

12. The composition according to claim 1, wherein the polyether-amine of the general formula (I) [component (b2)] is present in the curable epoxy resin composition in a concentration from about 0.04 mol to about 0.9 mol, calculated per one epoxy group weight equivalent present in the epoxy resin composition of the composition.

13. The composition according to claim 1, wherein the total amount of component (b1) and component (b2) within the epoxy resin composition is used in concentrations within the range of 0.8 to 1.2 reactive group equivalents, contained in the total amount of component (b1) and component (b2), calculated per one epoxy equivalent present in the epoxy resin component.

14. The composition according to claim 1, wherein said composition further comprises a filler material and a curing agent, and optionally at least one additive including a processing aid, a hydrophobic compound, a wetting/dispersing agent, a plasticizer, an antioxidant, a light absorber, a pigment, a flame retardant, or a fiber.

15. The composition according to claim 13, wherein a filler is present in the composition within the range of about 50% by weight to about 80% by weight, calculated to the total weight of the epoxy resin composition.

16. The composition according to claim 13, wherein a mineral filler is present in a porous form which optionally is coated, wherein the density of said filler material is within the range of 60% to 80%, compared to the real density of the non-porous filler material.

17. The composition according to claim 16, wherein said porous filler has a surface which is higher than 20 m$^2$/g (BET m$^2$/g).

18. The composition according to claim 13, wherein a catalyst is present in the composition in a concentration of about 0.05% to 0.2% by weight, calculated to the weight of the epoxy resin component present in the composition.

19. The composition according to claim 13, wherein a hydrophobic compound is added to the epoxy resin composition in an amount of from 0.1% to 10%, calculated to the weight of the epoxy resin component present.

20. A method of producing the curable epoxy resin composition according to claim 1, comprising mixing the components of the epoxy resin composition and all the further additives which optionally may be present in the epoxy resin composition, in any desired sequence, optionally under vacuum.

21. A method of producing an insulation system suitable for use in an electrical article, the method comprising curing the curable epoxy resin composition according to claim 1.

22. The method according to claim 21, wherein the curable epoxy resin composition is cured at a temperature within the range of 50° C. to 280° C.

23. An electrical insulation system, comprising a material formed from curing a curable epoxy resin composition, wherein the curable epoxy resin composition comprises:
an epoxy resin component,
a hardener component, and
optionally at least one additive,
wherein:
(a) said epoxy resin component is an epoxy resin compound or a mixture of epoxy resin compounds;
(b) said hardener component comprises
(b1) an aliphatic and cycloaliphatic or aromatic polycarbonic acid anhydride; and
(b2) a polyether-amine of the general formula (I):

wherein n is an integer from 2 to 8; and m is from about 3 to about 100;
(c) the polycarbonic acid anhydride is present in the curable epoxy resin composition in a concentration of 0.60 Mol to 0.93 Mol, calculated per one epoxy group weight equivalent present in the epoxy resin component of the composition; and
(d) the polyether-amine of the general formula (I) is present in the curable epoxy resin composition in a concentration of about 0.02 Mol to about 0.1 Mol, calculated per one epoxy group weight equivalent present in the epoxy resin component of the composition.

24. An electrical article comprising the electrical insulation system according to claim 23, wherein the electrical article is a dry transformer; a medium or high-voltage insulation for indoor or outdoor use; a medium or high voltage bushing; a long-rod, composite or cap insulator; a base insulator in a medium-voltage sector; an insulator associated with outdoor power switches; a measuring transducer; a leadthrough; an overvoltage protector; a switchgear construction; a power switch; an electrical machine; a transistor or other semiconductor element; or an electrical component.

25. The composition according to claim 1, wherein the aliphatic and cycloaliphatic or aromatic polycarbonic acid anhydride is a phthalic acid anhydride.

26. The composition according to claim 1, wherein the epoxy resin component comprises glycidyl compounds containing at least two 1,2-epoxy groups per molecule and having an epoxy value (equiv./kg) of at least four.

27. The composition according to claim 1, wherein the epoxy resin component comprises glycidyl compounds containing at least two 1,2-epoxy groups per molecule and having an epoxy value (equiv./kg) of about 5.0 to 6.1.

28. The composition according to claim 5, wherein the compound of formula (IV) is a long chain polypropylene glycol diglycidyl ether with an average molecular weight within the range of about 400 to about 5000 Dalton.

29. The composition according to claim 5, wherein the compound of formula (IV) is present in an amount within the range of 5 to 15 phr (parts per hundred parts) of the epoxy resin component.

30. The composition according to claim 5, wherein the compound of formula (IV) is present in an amount within the range of 7 to 10 phr (parts per hundred parts) of the epoxy resin component which is an epoxy resin component of formula (II) and/or formula (III).

31. The composition according to claim 1, wherein the hardener component (b1) is methyl-tetrahydrophthalic anhydride (MTHPA).

32. The composition according to claim 1, wherein the hardener component (b1) is present in the curable epoxy resin composition in a concentration of 0.68 mol to 0.75 mol, calculated per one epoxy group weight equivalent present in the epoxy resin component of the composition.

33. The composition according to claim 1, wherein in formula (I), n is 2, 3, or 5; and m is within the range of about 5 to about 40.

34. The composition according to claim 1, wherein in formula (I), n is 3 or 5; and m is within the range of about 6 to about 20.

35. The composition according to claim 1, wherein the residue [—C$_n$H$_{2n}$—O—] of formula (I) stands for ethylene-oxy or propylene-oxy.

36. The composition according to claim 1, wherein the polyether-amine of the general formula (I) [component (b2)] is present in the curable epoxy resin composition in a concentration from about 0.06 mol to about 0.08 mol, calculated per one epoxy group weight equivalent present in the epoxy resin component of the composition.

37. The composition according to claim 1, wherein the polyether-amine of the general formula (I) [component (b2)] is present in the curable epoxy resin composition in a concentration from about 0.07 mol to about 0.08 mol, calculated per one epoxy group weight equivalent present in the epoxy resin component of the composition.

38. The composition according to claim 1, wherein the total amount of component (b1) and component (b2) within the epoxy resin composition is one reactive group equivalent, contained in the total amount of component (b1) and component (b2), per one epoxy equivalent present in the epoxy resin component.

39. The composition according to claim 1, wherein said composition further comprises a filler material comprising a mineral filler, and a curing agent, and optionally at least one additive including a processing aid, a hydrophobic compound, a wetting/dispersing agent, a plasticizer, an antioxidant, a light absorber, a pigment, a flame retardant, or a fiber.

40. The composition according to claim 14, wherein the filler is present in the composition within the range of about 60% by weight to about 75% by weight, calculated to the total weight of the epoxy resin composition.

41. The composition according to claim 14, wherein the filler is present in the composition within the range of about 65% by weight to about 70% by weight, calculated to the total weight of the epoxy resin composition.

42. The composition according to claim 14, wherein the filler is present in the composition within the range of about 68% by weight to about 70% by weight, calculated to the total weight of the epoxy resin composition.

43. The composition according to claim 16, wherein said porous filler has a surface which is higher than 30 m$^2$/g (BET).

44. The composition according to claim 16, wherein said porous filler has a surface which is within the range of 30 m$^2$/g (BET) to 100 m$^2$/g (BET).

45. The composition according to claim 16, wherein said porous filler has a surface which is within the range of 40 m$^2$/g (BET) to 60 m$^2$/g (BET).

46. The composition according to claim 14, wherein the composition comprises the hydrophobic compound, wherein the hydrophobic compound is added to the epoxy resin composition in an amount of from 0.25% to 5% by weight, calculated to the weight of the epoxy resin component present.

47. The composition according to claim 14, wherein the composition comprises the hydrophobic compound, wherein the hydrophobic compound is added to the epoxy resin composition in an amount of from 0.25% to 3% by weight, calculated to the weight of the epoxy resin component present.

48. The method according to claim 21, wherein the curable epoxy resin composition is cured under application of vacuum.

49. The method according to claim 21, wherein the curable epoxy resin composition is cured at a temperature within the range of 100° C. to 200° C.

50. The method according to claim 21, wherein the curable epoxy resin composition is cured at a temperature within the range of 100° C. to 170° C.

* * * * *